United States Patent [19]

Moffatt et al.

[11] Patent Number: 4,716,763
[45] Date of Patent: Jan. 5, 1988

[54] JET FLOW IN AN ANGULAR VELOCITY SENSOR

[75] Inventors: E. Marston Moffatt, Glastonbury; Richard E. Swarts, Simsbury, both of Conn.

[73] Assignee: United Technologies Corporation, Hartford, Conn.

[21] Appl. No.: 663,519

[22] Filed: Oct. 22, 1984

[51] Int. Cl.$^4$ .......................... G01P 3/26; G01P 3/44
[52] U.S. Cl. ................................. 73/505; 73/516 LM
[58] Field of Search ............. 73/505, 516 R, 516 LM; 417/413

[56] References Cited

U.S. PATENT DOCUMENTS

| | | | |
|---|---|---|---|
| 2,312,712 | 3/1943 | Hartline | 417/413 |
| 3,381,623 | 5/1968 | Elliott | 417/413 |
| 3,587,328 | 6/1971 | Schuemann | 73/516 LM |
| 3,635,095 | 1/1972 | Schuemann | 73/505 |
| 4,254,659 | 3/1981 | Benedetto et al. | 73/516 LM |

FOREIGN PATENT DOCUMENTS 617716  7/1978  U.S.S.R. ................. 73/505

*Primary Examiner*—Stewart J. Levy
*Assistant Examiner*—John E. Chapman, Jr.
*Attorney, Agent, or Firm*—Francis J. Maguire, Jr.

[57] ABSTRACT

An angular velocity sensor utilizing the Coriolis effect on a fluid jet employs increased spacing between the sensing elements to increase the scale factor and to reduce flow disturbances. A metal diaphragm pump is utilized to improve the ability to control the flow rate. Flow disturbances are further reduced by using a single, symmetrical central flowhole, eliminating curtain holes, and providing only two discharge paths oriented 180° apart.

14 Claims, 12 Drawing Figures

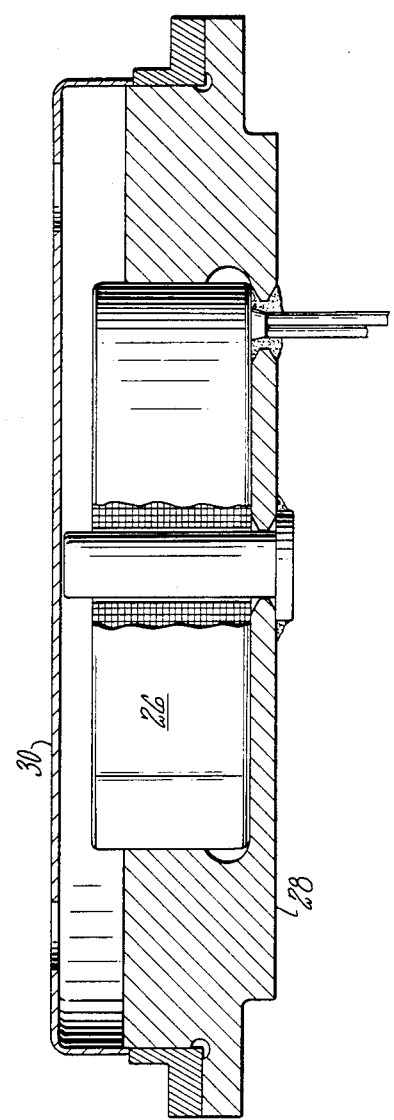

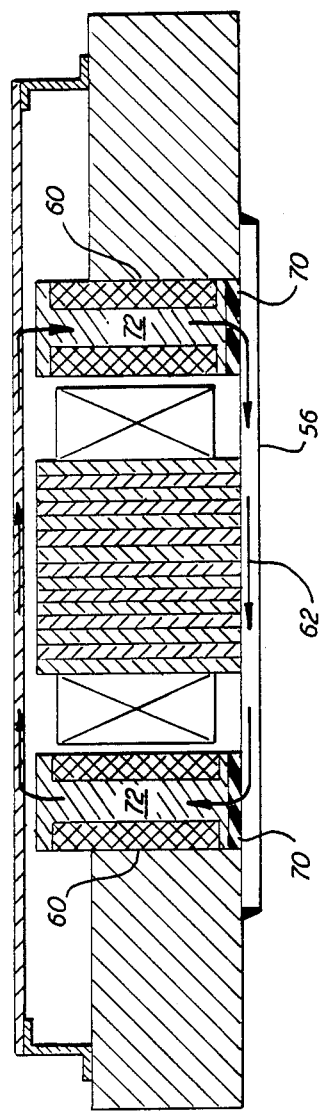

JET FLOW IN AN ANGULAR VELOCITY SENSOR

CROSS REFERENCE TO RELATED APPLICATIONS

The invention described herein may employ some of the teachings disclosed and claimed in commonly owned copending applications filed on even date herewith by Moffatt et al., U.S. patent application Ser. No. 663,525, entitled ANGULAR VELOCITY SENSOR HAVING LOW TEMPERATURE SENSITIVITY; and also by Moffatt et al., U.S. patent application Ser. No. 663,518, entitled AN IMPULSE JET PUMP.

TECHNICAL FIELD

This invention relates to angular velocity sensors, and more particularly to angular velocity sensors having sensing elements cooled differentially by a fluid jet in the presence of sensor rotation.

BACKGROUND ART

Fluid jet angular velocity sensors utilizing sensing elements for sensing the speed of rotation are well known in the art. U.S. Pat. No. 3,500,690 to Schuemann, 4,020,700 to Lopiccolo et al., and 3,581,578 to Schuemann, all disclose fluid jet angular velocity sensors having a pair of sensing elements for sensing the speed of rotation about an axis perpendicular to a "plane of sensitivity".

The sensing elements are usually positioned symmetrically about a reference jet axis with each element on opposite sides and at equal distances therefrom. A fluid jet is directed along the reference jet axis from a nozzle which cools the sensing elements in substantially equal proportions in the absence of sensor rotation. Due to the well-known Coriolis effect, the fluid jet impinges non-symmetrically, i.e., the fluid jet "bends" in the presence of sensor rotation. Because of the well-known characteristic of fluid jets in which the higher velocity fluid particles are concentrated at the center of the jet and the lower velocity particles around its periphery, the sensing elements are cooled in different proportions whenever the fluid jet impinges nonsymmetrically upon the sensing elements.

Parametric studies to evaluate the effects of various geometric design factors on angular rate sensor performance have been undertaken. Such sensors are found to be measurably affected by asymmetries imposed on almost any part of the gas flowpath. Asymmetries associated with the nozzle and sensor plug regions cause especially large output shifts which are often quite flow sensitive. Unequal deflection of sensor wires under jet impact is found to be a particularly troublesome flow dependent asymmetry, especially at high flowrates.

The prior art use of pumps having a Piezoelectric (PZT) diaphragm involves special problems. A source of unrepeatability is changes in the pump impedance due to temperature hysteresis. This causes unrepeatability in flow rate after temperature cycling. The error gradually disappears if the pump is kept at room temperature, but it can take as long as a week for this to occur. This phenomenon is well known for materials with high dielectric constance.

The optimum frequency is difficult to achieve using PZT diaphragms because the PZT pump cannot be driven harder than about 6 volts due to power supply limitations. In addition, with a PZT diaphragm, the deflection is a direct function of voltage and thickness. Changing the thickness is a very time consuming manufacturing operation and it has been found that there is a definite limit on minimum thickness because of manufacturing difficulties. Thus, both minimum frequency and maximum deflection are limited by properties of the PZT material itself.

Various design changes are needed to modify the sensor in order to provide improved flow thereby increasing accuracy.

DISCLOSURE OF INVENTION

The object of the present invention is to improve the accuracy of angular rate sensor by improving the flow of fluid therein.

According to the present invention, the spacing between the sensing elements is increased such that the elements are disposed more toward the periphery of the sensor plug than toward the center to increase the scale factor and to reduce flow disturbances due to the existence of a rarefied gas body surrounding each of the heated sensing wires and due to the overlapping of the bodies under various conditions.

In further accord with the present invention, an electromagnetically driven metal diaphragm pump without valves is provided for use as an impulse jet pump in an angular rate sensor. The pump includes an anvil for mounting a flexure upon which the diaphragm is mounted. The pump also includes a magnetic core mounted within the anvil and having a drive coil wound thereon. The core provides a low reluctance path for magnetic drive flux in a magnetic drive circuit which includes the core, the diaphragm, and an air gap between the core and the diaphragm. An AC drive signal is provided to the drive coil and the resulting time-varying magnetic flux causes the diaphragm to vibrate in an oscillatory manner. The magnitude of the vibratory motion, i.e., the amplitude of the diaphragm displacement controls the fluid flow rate in the jet stream within the sensor. The pump also includes sensing poles with sensing coils wound thereon and mounted in quadrature with respect to the drive coil. The sensing poles provide a low reluctance path for magnetic sensing flux in a magnetic circuit in which a sensing signal is induced by virtue of the vibratory motion of the diaphragm. The sensed signal is indicative of diaphragm displacement amplitude and frequency and is used by a control circuit to control the fluid flow rate.

In still further accord with the present invention, the sensor plug has a single, symmetrical central flowhole.

In still further accord with the present invention, to further improve the symmetry of the flow and thus improve the flow curve, curtain holes are eliminated so there is a single jet hole which is inherently symmetric.

In still further accord with the present invention, the pump discharge is routed through two holes 180 degrees apart to improve the basic flow symmetry.

The advantages of the above design changes to improve flow is the reduction of device sensitivity to flow path disturbances. Effects of these disturbances are minimized by such flow design changes.

These and other objects, features, and advantages of the present will become more apparent in light of the detailed description of a best mode embodiment thereof as illustrated in the accompanying drawing.

BRIEF DESCRIPTION OF DRAWING

FIG. 2 is cutaway illustration of the pump assembly of FIG. 1;

FIG. 6 is a section view of the pump of FIG. 5 showing the sensing coils;

BEST MODE FOR CARRYING OUT INVENTION

Figure 1:
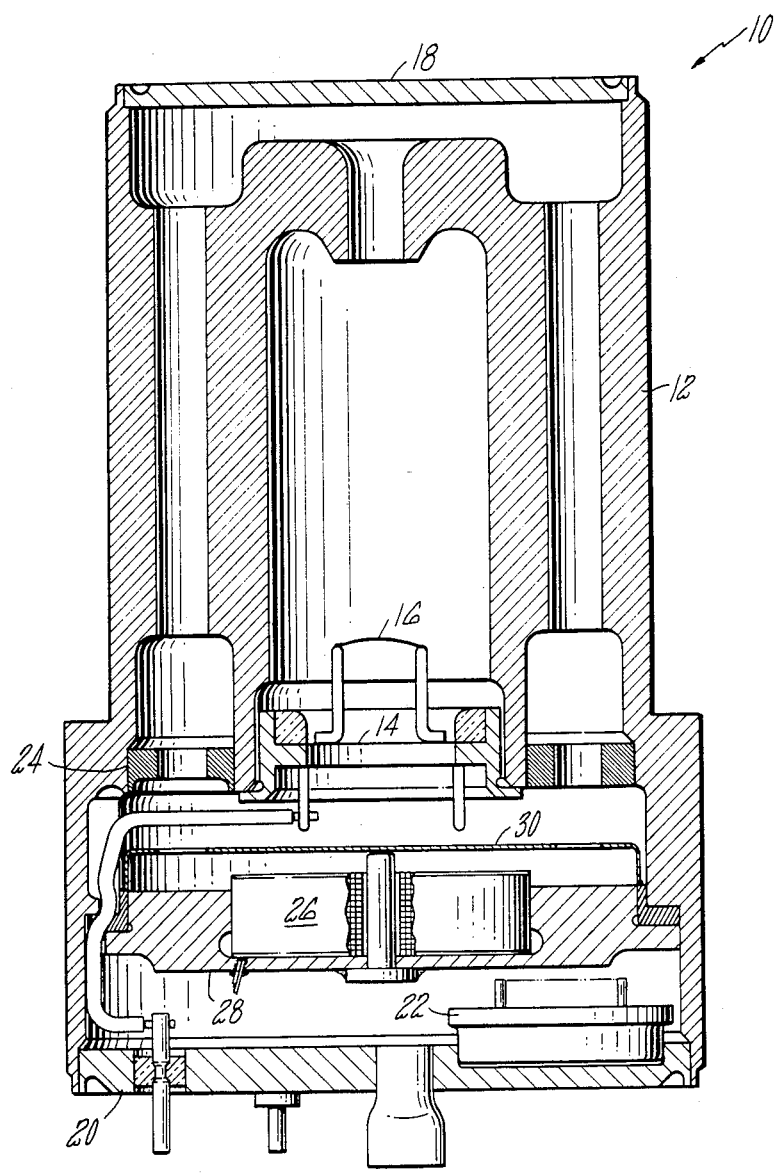
FIG. 1 is a cutaway view of an angular rate sensor.

FIG. 1 is a cutaway illustration of the interior of an angular rate sensor 10 according to the present invention. The sensor assembly includes a nozzle block 12, a sensor plug 14 having a pair of sensor wires 16 (only one wire is shown in the illustration), an end cap 18, a header 20, and an electronics module 22 having bridge resistances and operational amplifiers, an alignment ring 24, a pump coil 26, a pump anvil 28, and a pump diaphragm 30.

Referring now to FIG. 2, a more detailed illustration of the pump assembly of FIG. 1 is shown. In accordance with the present invention, a metal diaphragm 30 pump driven electromagnetically is constructed without valves. While design calculations indicated that even though this may theoretically be less efficient electrically than the prior art piezoelectric diaphragm, the mechanical Q is higher which compensates for this. Also, the increased electrical load of the pump with the metal diaphragm is such a small part of the system power requirements (0.060 watts vs. 7 watts) that an increase in power required can be tolerated.

As described above in the background art section, one source of unrepeatability in the jet is caused by the basic properties of the piezoelectric material used to construct the prior art pump diaphragm. This material is subject to temperature hysteresis. This is evidenced by a change in the pump impedance (and hence in the flowrate) during temperature cycling when the pump is either heated or cooled from room temperature to the test limits of minus 35 degrees Fahrenheit to plus 155 degrees Fahrenheit and then returned to room temperature. This effect (in terms of the original value) gradually disappears if the pump is kept at room temperature, but it can take as long as a week for this to occur. This phenomenon is well known for materials with high dielectric constants and is also known to affect capacitors.

The mechanical operation of the metal diaphragm pump is identical to the prior art pump. It is an impulse jet pump with no valves and has the same volumes and clearances.

The metal diaphragm has no temperature hysteresis, so the basic variability and output experienced in the prior art disappears. In addition, the electromagnetic design is much more flexible in designing to certain voltage constraints or desired frequencies. The present pump cannot be driven harder than about six volts, because of power supply limitations. The prior art use of a piezoelectric diaphragm introduced considerations of voltage and thickness when designing for a particular deflection amplitude. Changing the thickness of a piezoelectric diaphragm is a very time consuming manufacturing operation and it has been found that there is a definite limit on minimum thickness because of manufacturing difficulties. Thus, the use of a metal diaphragm eliminates limitations imposed by the prior art on minimum frequency and maximum deflection.

Deviations in the flow curve of the jet (bridge balance vs. jet velocity) have been found to be frequency sensitive. The operating frequency of the prior art pumps is usually around 3800 to 4400 hertz and this is too high to minimize flow curve errors. A desirable frequency is around 3000 hertz. Efforts made to build piezoelectric diaphragms with this frequency failed due to curling and breakage of thin minomorphs resulting in very high scrap rates. The electromagnetic pump, on the other hand, is designed for a much wider range of frequency by simply adjusting the diaphragm thickness. The thickness for 3000 hertz is about 0.015 cm which is quite feasible for a metal diaphragm. There is no operating voltage limitation for the electromagnetic pump since the drive coil 26 can be wound for any desired voltage by changing the number of turns.

Manufacturing the electromagnetic pump involves standard machining techniques with common materials so the choice of vendors is very wide, whereas the piezoelectric diaphragm is so specialized, that there are very few sources of supply. Deviations in the flow curve have been traced to slight irregularities in the spacing and shape of the flow holes in the prior art plug. These are downstream from the wires, but any pressure disturbances created by them can influence the flow direction at the wires. Drastic changes can be created by blocking one of these holes. Since the prior art uses five holes and the spacing, size, burring, etc., on each hole is critical, it is impossible to make plugs exactly symmetric.

Figure 5B:
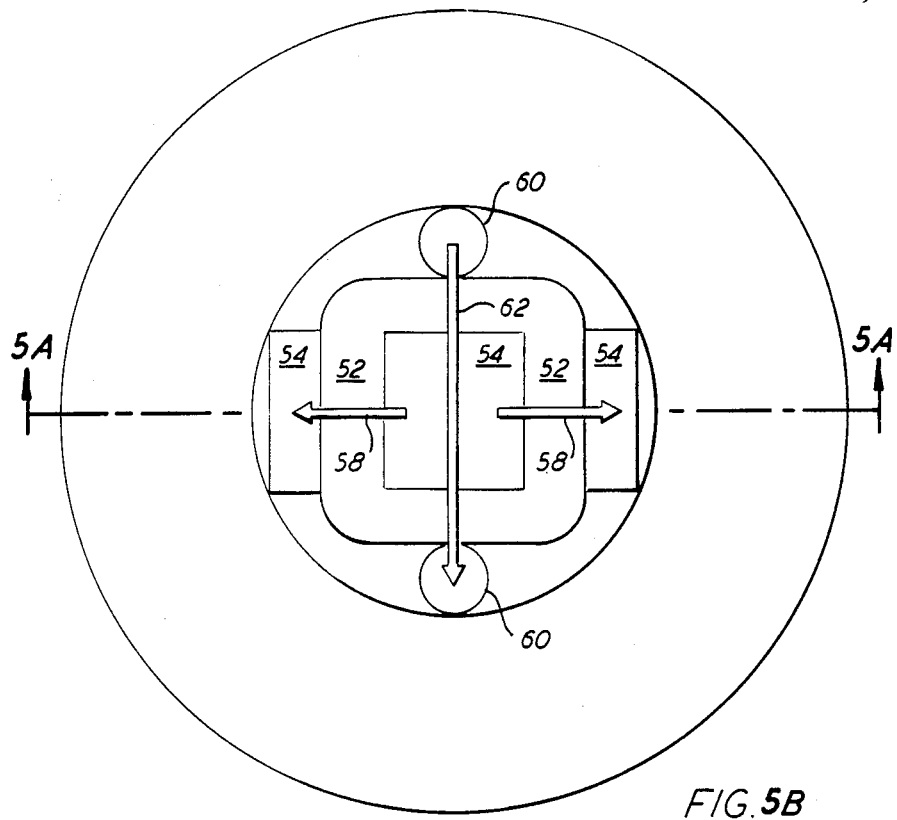
FIG. 5B is a plan and FIG. 5A a section view of an alternate pump assembly according to the present invention.
Figure 5A:
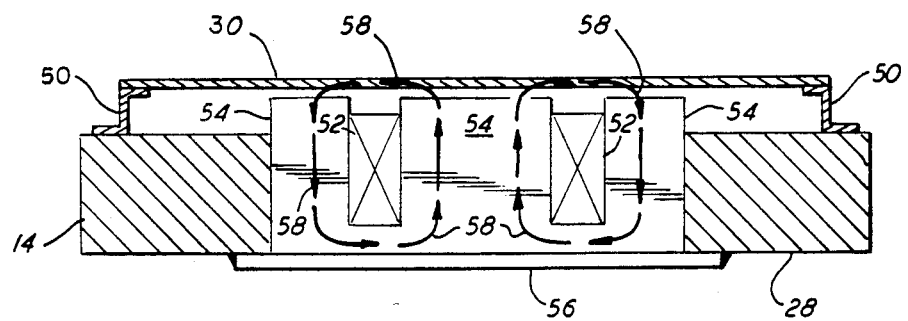

An alternate, preferred embodiment of the pump of FIG. 1 is shown in plan and in section views in FIG. 5. A metal diaphragm 30 is welded to a flexure 50 which is in turn welded to an anvil 28. A drive coil 52 is wound around the central post of a laminated core 54. A coil support plate 56 is welded to the anvil 28 to support the laminated core 54 and the drive coil 52 within.

The drive coil 52 produces magnetic flux which is shown pictorially by lines 58. The magnetic flux path includes a path through the laminated core 54, the air gap between the diaphragm 30 and the laminated core 54, the diaphragm 30 itself, and back through the air gap between the diaphragm and the outside of the laminated core.

Sensing poles 60 are shown producing sensing flux 62 in qraduature with the drive flux 58. The sensing flux is used to sense the amplitude of the deflection and the frequency of the vibratory deflection motion with respect to the device's resonant frequency.

The diaphragm 30 and the core 54 are of magnetic steel such as the silicon alloys TRANSCOR or SILECTRON or a nickel-iron steel such as Allegany Ludlum 4750 or SUPERMALLOY. These steels have the same coefficients of expansion as the 400 series stainless steels so do not introduce temperature stresses. They have especially low magnetic hysteresis losses and when used in thin sheets (0.005–0.015 cm) have low eddy current losses so that electrical losses in the magnetic circuit are minimized.

The diaphragm 30 is resistance-welded to a thin flexure 50 of compatible steel such as a 400 stainless steel. The flexure 50 is resistance-welded to the stainless steel anvil 28.

This structure is similar to the prior art design using a PZT bi-morph for a diaphragm except that the flexure 50 and anvil 28 are INVAR and the flexure is lead-soldered to the bimorph (in the prior art).

According to the present invention the flexures 50 are stamped parts and the diaphragms are cut from standard sheet stock so this part of the assembly is much cheaper than the prior art PZT structure.

The drive coil 54 may be a magnetic E-core structure, having three poles.

The additional sense poles 60 are shown in more detail in FIG. 6. The magnetic circuits of the drive and sense coils are independent of each other because they are arranged in quadrature. Thus the drive current will not induce any voltage in the sense coils. This is essential for the operation described below.

The sensing flux 62 of FIG. 6 is shown passing through the support plate 56 and through a pair of permanent magnets 70. The sensing flux is produced by the sensing coils 60 which are coiled around magnetic steel cores 72.

A magnetic device of the type shown in FIGS. 2, 5, and 6 requires a fixed DC magnetic bias for the drive circuit in addition to an AC magnetizing drive current. Of course, the bias could be supplied either by a permanent magnet in the circuit or by a DC current superimposed in the AC. However, it requires less power to use a DC bias current rather than magnets. This is because the magnets increase the magnetic reluctance of the drive coils so much that the total power consumption is greater. However, either method may be used. On the other hand, for the sense coils of FIGS. 5 & 6, magnets are preferred because these coils only produce a voltage which is fed into a high impedance electronic circuit. So, for the sensing coils, this type of bias simplifies the electronics and reduces power consumption.

The purpose of the sense coils is twofold:
(1) they measure diaphragm movement and thus supply a signal that can be amplified and used to control drive current at the proper phase angle to make the device automatically operate at its resonant frequency;
(2) they are used to measure the product of diaphragm displacement and frequency by using the following equation:

$$E = -10^{-8} N \frac{d\phi}{dt},$$

where,
N = No. of turns, and
$\phi$ = flux.
Since the flux varies inversely with the a gap, with a fixed magnetic bias created by the permanent magnets, $$\frac{d\phi}{dt} = 2\pi f \phi_o \left[ \frac{\Delta g}{g_o} \right] \cos\omega t, \text{ and}$$

-continued $$E_{max} = 10^{-8} N(2\pi f) \left[ \frac{\Delta g}{g_o} \right] \phi_o$$

where
f = frequency,
$\Delta g$ = air gap variation due to diaphragm movement,
$g_o$ = mean air gap, and
$\phi_o$ = mean flux.
Since N, $g_o$, and $\phi_o$ are fixed, $E_{max}$ is proportional to:

(f·$\Delta g$).

This quantity is proportional to the volumetric displacement of the pump which in turn determines the flow rate through a fixed nozzle.

Thus, the absolute voltage from the sense coils can be used as a feedback control signal for controlling the drive current. By programming the desired sense voltage at each temperature, the flow rate can be set independently of any changes in the pump hysteresis characteristics.

Figure 7:
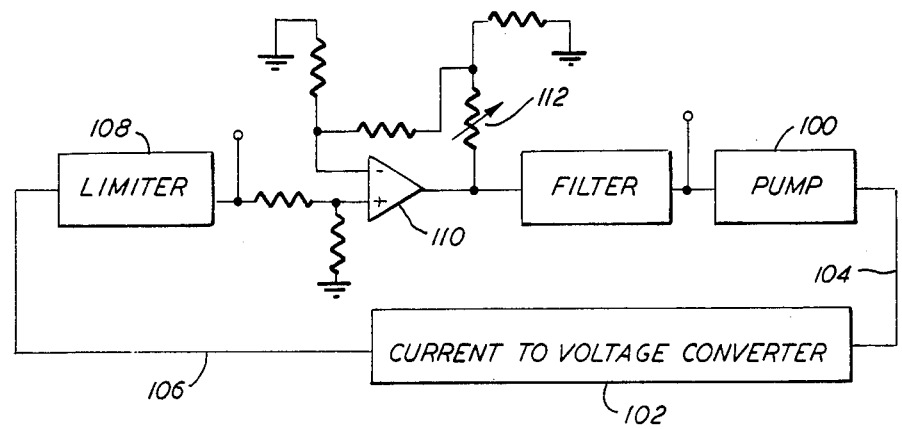
FIG. 7 is a simplifed block diagram illustration of a drive circuit for driving the metal diaphragm pump shown in FIGS. 1 & 2.

Referring now to FIG. 7, a block diagram illustration of a circuit for driving the metal diaphgram pump of FIGS. 1 & 2 is shown. The block diagram illustrates an oscillator circuit having the textbook amplification equation of:

$$K_R = \frac{K}{1 - \beta K},$$

where
K = the ampification of the oscillator amplifier,
$\beta$ = the ratio of the feedback voltage to the output voltage, and
$K_R$ = the ratio of the output signal voltage to the input signal voltage.

For oscillation to occur, the magnitude $\beta K$ must equal unity and the phase angle must equal zero degrees or some whole number multiple of 360°. The circuit includes a pump 100, a current to voltage converter 102 which may be viewed as converting the pump current on line 104 to a voltage on line 106, a limiter 108, and an amplifier 110 whose gain is controlled by a thermistor 112. The ability of the circuit of FIG. 7 to change the pump flow rate by using thermistor 112 to change the gain of amplifier 110 is relatively poor in certain extreme temperature ranges.

Figure 8:
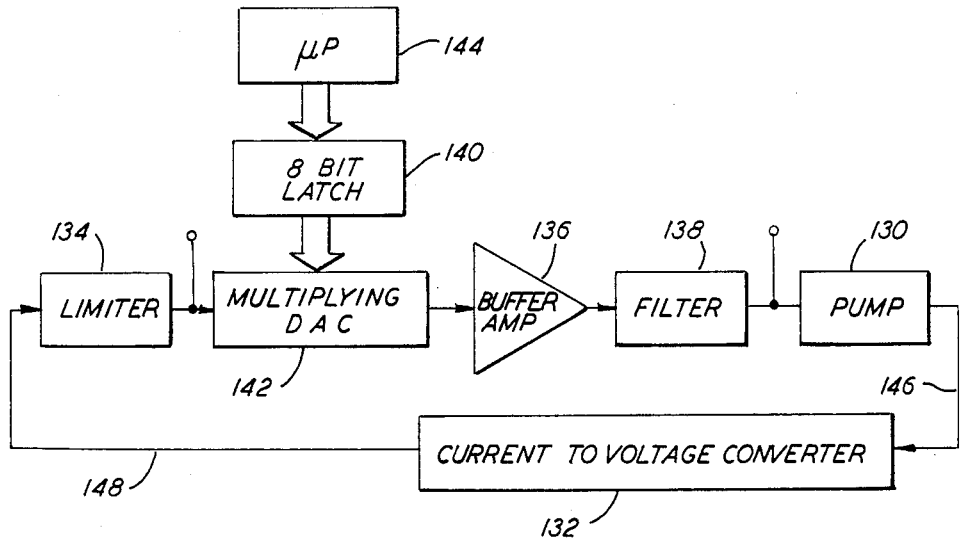
FIG. 8 is a simplified block diagram illustration of a drive circuit for driving the metal diaphgram pump of FIGS. 5 & 6.

FIG. 8 shows a drive circuit for driving the metal diaphgram pump of FIGS. 5 & 6. It also includes a pump 130, a current to voltage converter 132, a limiter 134, an amplifier 136, and a filter 138. However, the circuit of FIG. 8 also contains an 8-bit latch 140 which, in conjunction with a multiplying DAC, performs as an electronic attenuator under software control as dictated by a microprocessor 144. The pump current on a line 146 is converted to a voltage on a line 148 by means of the I TO V converter 132, passed through the limiter 134 and then applied to the input of the multiplying DAC 142. The attenuated signal is then buffered in the buffer amplifier 136, filtered in the filter 138 to produce a sinusoidal voltage signal to drive the pump 130. The voltage applied to the pump determines the diaphragm's oscillatory amplitude, and hence the flow rate of the the jet. By means of calibration software the desired pump voltage versus temperature can be obtained automatically with the resulting look up tables stored in EPROM. In the design of FIG. 7, a manual trim must be inserted to set the nominal pump voltage and the temperature compensation is obtained by use of the thermistor 112. This method has its limitations. The programmable version of FIG. 8, on the other hand, allows the pump to be fine-tuned by setting the DAC to the desired attenuation throughout the temperature range.

Figure 9:
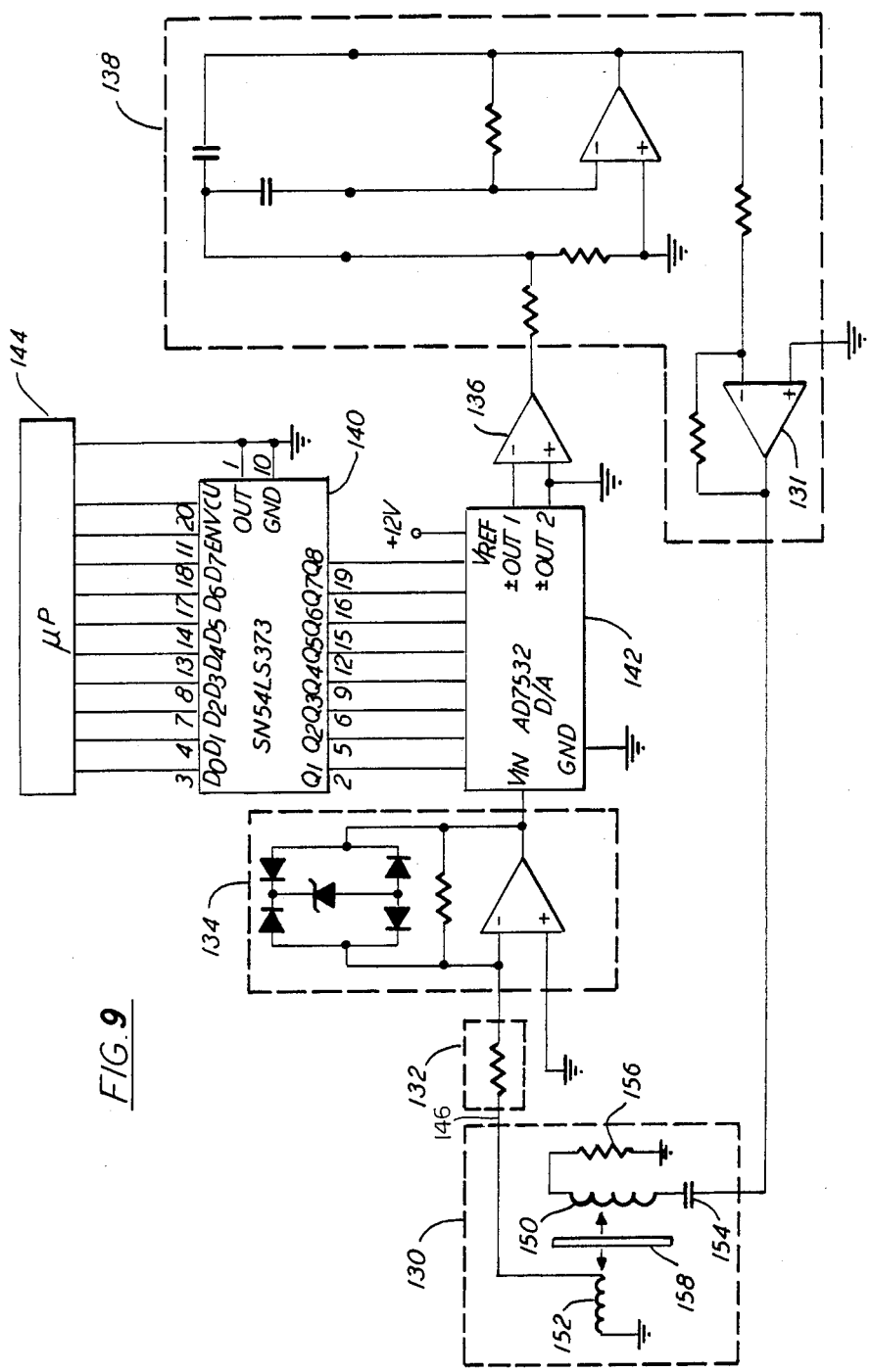
FIG. 9 is a more detailed schematic block diagram illustration of the circuit of FIG. 8.

FIG. 9 is a more detailed illustration of the circuitry of FIG. 8. The illustration of FIG. 9 is provided merely to show one implementation of the concepts presented in FIG. 8. Of course, it should be understood that FIG. 8 itself is merely one of many possible circuit variations which may be used to carry out the invention.

The pump 130 of FIG. 9 is shown having a drive coil 150 and a sense coil 152. The drive coil 150 is part of a series resonant circuit which includes a capacitor 154 and a resistor 156. (This tank circuit could be parallel resonant). The series resonant circuit is driven at its resonant frequency by an amplifier 131. This causes the diaphragm 30 (see FIG. 1) to vibrate because of the manner in which the magnetic circuit is formed. The sensing coil 152 is arranged in quadrature with respect to the drive coil 150 and therefore does not couple any of the drive current. However, the diaphragm also forms part of a magnetic circuit which includes the sensing coil's core, a gap, the plate 56, and the magnets 70 and the diaphragm's oscillatory movement causes an oscillatory change in the magnetic flux which is picked up as a voltage by the sensing coil 152 by virtue of Faraday's Law. Thus, the sensing coil is enabled to provide a feedback signal on the line 146 to the drive circuitry. Since the gain is preselected to a value of unity the oscillations in the drive coil are sustained.

It should be noted that a diaphragm can be driven with an AC current alone without any bias flux or a current but it will then run at double the line frequency. This mode entails higher electrical losses and makes operation at self-resonance more difficult. Therefore it is less desirable than the method described above.

Figure 3A:
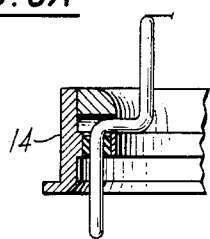
FIG. 3B is a plan and FIG. 3A a section view of a sensor plug according to the present invention.
Figure 3B:
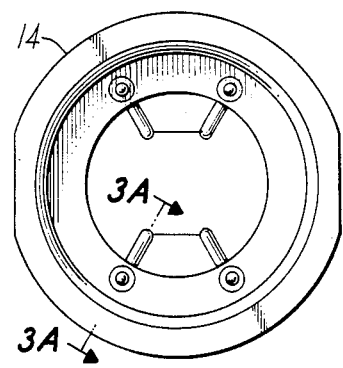
Figure 4B:
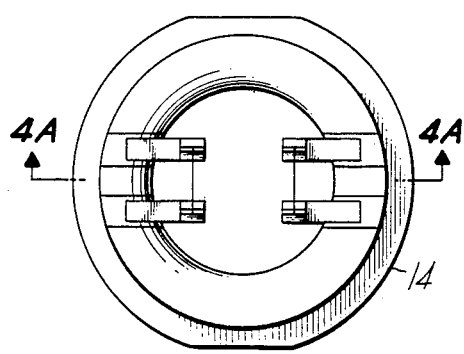
FIG. 4B is a plan and FIG. 4A a section view of an alternate sensor plug assembly according to the present invention.
Figure 4A:
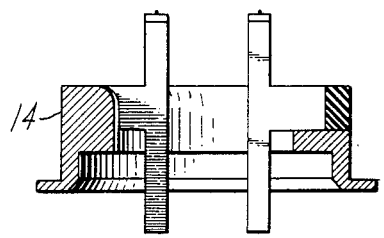

The new plug design, according to the present invention, replaces these five holes with a single central hole of greater total area as shown in various embodiments in FIGS. 1, 3, and 4. This single central hole can be machined to a closer tolerance than five holes and is inherently symmetric. To maintain comparable wire spacing, the posts that support the wires project into this central hole. However, the wires are spaced the same distance above the plug as in the prior art.

Increasing the spacing between the sensing wires increases the scale factor and also reduces the overlapping of the rarefied gas bodies surrounding the heated sensor wires. The spacing is increased to the extent that the sensing wires are substantially closer to the periphery of the cylindrical chamber than in the prior art. Since this error is a major one in the prior art, representing about one-half the error budget, any reduction in this is of major importance. The length of the individual wires is kept the same as the present.

The scale factor may be thought of as the amount of change in the cooling effects of the jet stream per unit change in angular velocity. Since the fluid jet has a velocity profile which is substantially parabolic, i.e., it has its faster moving particles in the center, the change in jet velocity due to the Coriolis effect on a sensing wire positioned near the jet center will be less than that of a sensing wire located further away from the center of the jet. Thus, the prior art spacing of about 0.2 cm between the sensing wires is increased, according to the present invention, to about 0.34 cm. This is for a cylindrical chamber having a diameter of about 0.9 cm and having its nozzle outlet about 1.2 cm away from its sensing wires.

Since the sensing wires are heated there will be a rarefied gas effect around each of the wires. Depending on how close the wires are to each other, their orientation with respect to the rotation of the vehicle in which the sensor is used, and other factors, the disturbances to the jet flow as a result of the existence of these rarefied gas regions can be substantial. According to the present invention, the best achievable error of the prior art, is reduced by a factor of about one-half.

Increasing the wire diameter from the prior art $3.8 \times 10^{-6}$ meter to about $5.1 \times 10^{-6}$ meter provides a wire which is about 2.4 times as stiff and gives a more rugged wire which is more stable physically. This has less "curl" than the thinner wire which means that after it is attached, it is straighter looking in the directional flow. This in turn means a more symmetric jet with a flatter flow curve and less temperature sensitivity.

To further improve the symmetry of the flow and thus improve the flow curve, the curtain holes are eliminated so there will be a single jet hole which is inherently symmetric without the six additional curtain holes used in the prior art which never can be machined in perfect symmetry. Although this was tried at one time in the past, and found to increase the scrap rate, the solution to the scrap rate problem has been found to be in lowering the pump frequency to about 3000 Hz and changing the nozzle outlet.

The prior art pump discharges through one hole into a plenum off-center from the jet. According to the present invention, a two-hole pump that discharges at two points 180 degrees apart restores the basic flow symmetry and simplifies and lowers the cost of the nozzle block. This is due to the elimination of the lower plenum and the reduced drilling required through the nozzle block, i.e., only two return holes need be drilled now instead of the prior art six holes.

Although the invention has been shown and described with respect to a particular embodiment thereof, various other changes, omissions, and additions in the form and detail thereof may be made therein without departing from the spirit and scope of the invention.

We claim:

1. Angular velocity sensor means, comprising:
   a nozzle block for enclosing a jet chamber having a reference jet chamber with a reference jet axis and having nozzle means disposed at one end of said chamber for discharging a fluid jet along said reference jet axis;
   a sensor plug having at least one pair of sensing elements mounted thereon, said plug disposed at an opposite end of said chamber such that said sensing elements are disposed symmetrically about said reference jet axis in a plane perpendicular thereto, each pair of sensing elements being cooled differentially in response to deflection of said fluid jet from said reference jet axis in the presence of sensor rotation about a rotation axis perpendicular to said reference jet axis, said deflection being in proportion to the angular velocity of said sensor, each of said sensing elements having resistance values which vary according to the amount of cooling received by each, said plug having a single passage for discharging fluid from said jet chamber, said passage disposed symmetrically with respect to said chamber and said sensing elements for reducing flow disturbances;

an impulse pump having a diaphragm of a selected material for delivering a fluid under pressure to said nozzle means to form said fluid jet; and detector circuit means, responsive to said sensing elements resistance values for providing signals indicative of said angular velocity.

2. The sensor of claim 1, wherein said diaphragm selected material is metal.

3. The sensor of claim 1, wherein said sensing elements are separated to maximize scale factor and minimize flow disturbances due to heating effects in said sensing elements.

4. The sensor of claim 1, wherein said sensing elements are wires, each about $5 \times 10^{-6}$ meter in diameter.

5. The sensor of claim 1, wherein said nozzle end of said jet chamber is penetrated only by said nozzle.

6. The sensor of claim 5, wherein said impulse pump operates at a frequency of about 3000 Hz.

7. The sensor of claim 1, wherein said impulse pump operates at a frequency of about 3000 Hz.

8. The sensor of claim 1, wherein said pump discharges into two passages in said nozzle block disposed on opposite sides of said chamber.

9. The sensor of claim 1, wherein said fluid discharged from said single passage is returned by means of said impulse pump to said nozzle means through two passages disposed 180 degrees apart within said nozzle block.

10. The sensor of claim 2, wherein said pump further comprises a magnetic steel laminated core having a drive coil wound thereon, said core providing a low reluctance path for magnetic drive flux in a magnetic drive circuit including said core, said magnetic steel diaphragm, and a gap between said core and said diaphragm.

11. The sensor of claim 10, wherein said core is E-shaped.

12. The sensor of claim 10, wherein said pump further comprises sensing poles having a sensing coil wound thereon, said poles providing a low reluctance path for magnetic sensing flux in a magnetic circuit for inducing a sensing signal in a sensing circuit, said sensing signal being indicative of diaphragm displacement amplitude and frequency, said magnetic circuit including said poles, said diaphragm, and a gap between said poles and said diaphragm and wherein said sensing coils is disposed in quadrature with respect to said drive coil.

13. The sensor of claim 2, wherein said pump includes a steel flexure resostance welded to said diaphragm.

14. The sensor of claim 12, wherein said magnetic sensing circuit includes permanent magnets.

* * * * *

UNITED STATES PATENT AND TRADEMARK OFFICE
CERTIFICATE OF CORRECTION

PATENT NO. : 4,716,763

DATED : 1/5/88

INVENTOR(S) : E. Marston Moffatt et al

It is certified that error appears in the above-identified patent and that said Letters Patent is hereby corrected as shown below:

Column 9, line 8.        Cancel "elements" and substitute
                         -- elements' --

Column 10, line 25.      Cancel "resostance" and substitute
                         -- resistance --

Signed and Sealed this

Tenth Day of January, 1989

Attest:

DONALD J. QUIGG

Attesting Officer        Commissioner of Patents and Trademarks